United States Patent Office 3,823,143
Patented July 9, 1974

3,823,143
PRODUCTION OF 2,4-HEXAHYDRO-PYRIMIDINODIONES
Franz Merger, Ludwigshafen (Rhine) and Harro Petersen, Frankenthal, Pfalz, Germany, assignors to BASF Aktiengesellschaft, Ludwigshafen (Rhine), Germany
No Drawing. Continuation of abandoned application Ser. No. 730,947, May 21, 1968. This application Feb. 6, 1970, Ser. No. 7,410
Claims priority, application Germany, May 27, 1967, P 16 70 232.2
Int. Cl. C07d 51/18
U.S. Cl. 260—260    9 Claims

ABSTRACT OF THE DISCLOSURE

The production of 2,4-hexahydropyrimidinodiones by reaction of 2-hexahydropyrimidone-4-ethers or 2-hexahydropyrimidon-4-ols with oxidizing agents. The products of the process are valuable starting materials for the production of herbicides, bleaching agents and detergents.

---

This application is a continuation of application Ser. No. 730,947, filed May 21, 1968, now abandoned.

The invention relates to the production of 2,4-hexahydropyrimidinodiones by reaction of 2-hexahydropyrimidone-4-ethers or 2-hexahydropyrimidon-4-ols with oxidizing agents.

It is known from the Journal of Organic Chemistry, volume 26 (1961), pages 1877 to 1884, that 2,4-hexahydropyrimidinodiones can be prepared by reaction of α,β-unsaturated carboxylic acids with urea or by way of the reaction of β-amino acids with isocyanate. Both methods use difficultly accessible starting materials; only a limited number of substituted hexahydropyrimidinodiones can be prepared in this way, usually in unsatisfactory yields.

The object of this invention is to provide a new process for the production of 2,4-hexahydropyrimidinodiones in a simple way and in good yields and purity, using readily accessible starting materials.

This and other objects and advantages of the invention are achieved and 2,4-hexahydropyrimidinodiones which may bear substituents in the 5- and/or 6-position can be obtained advantageously by reacting unsubstituted or appropriately substituted 2-hexahydropyrimidone-4-ethers or 2-hexahydropyrimidon-4-ols with oxidizing agents.

When 5,5-dimethyl-6-isopropylhexahydropyrimidin-2-on-4-ol and hydrogen peroxide are used, the reaction may be represented by the following equation:

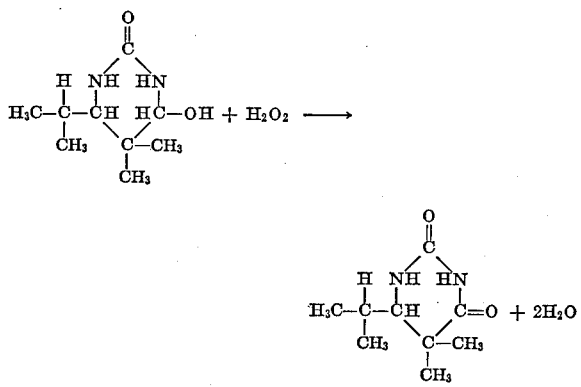

In contrast to the abovementioned prior art methods, the process according to this invention gives a large number of 2,4-hexahydropyrimidinodiones, using readily accessible starting materials, in a simple manner, in good yields and, surprisingly, without formation of appreciable amounts of byproducts.

The starting materials used are 2-hexahydropyrimidone-4-ethers or 2-hexahydropyrimidon-4-ols. Preferred starting materials (and consequently preferred end products) are those which bear identical or different substituents in the 5- and/or 6-position which in each case may be hydrogen atoms or alkyl, cycloalkyl, aralkyl or aryl radicals, particularly those having up to twelve carbon atoms, or a heterocyclic radical attached via a carbon atom, particularly one having five or six members and one or two nitrogen atoms, an oxygen atom and/or a sulfur atom. In the preferred starting materials an oxygen atom is attached in the 4-position to the pyrimidone nucleus and to another radical of the said types.

For example the following 2-hexahydropyrimidone-4-ethers or 2-hexahydropyrimidon-4-ols may be used as starting materials:

5,6-dimethyl-2-hexahydropyrimidon-4-ol,
5,6-dioctyl-2-hexahydropyrimidon-4-ol,
5,6-dicyclohexyl-2-hexahydropyrimidon-4-ol,
5,6-dibenzyl-2-hexahydropyrimidon-4-ol,
5,6-diphenyl-2-hexahydropyrimidon-4-ol,
5,6-dipyridyl-(2)-2-hexahydropyrimidon-4-ol,
5-ethyl-6-dodecyl-2-hexahydropyrimidon-4-ol,
5-phenyl-6-isopropyl-2-hexahydropyrimidon-4-ol,
5-cyclohexyl-6-butyl-2-hexahydropyrimidon-4-ol,
5-methyl-6-naphthyl-2-hexahydropyrimidon-4-ol,
5,5-dimethyl-5-piperidyl-(2)-2-hexahydropyrimidon-4-ol,
5-morpholinyl-(2)-6,6-dimethyl-2-hexahydropyrimidon-4-ol,
5-ethyl-5-methyl-6-phenyl-2-hexahydropyrimidon-4-ol,
5,5-dimethyl-2-hexahydropyrimidon-4-ol,
6-isopropyl-6-methyl-2-hexahydropyrimidon-4-ol,
5,5-dimethyl-6,6-diethyl-2-hexahydropyrimidon-4-ol,
5,5,6-triethyl-2-hexahydropyrimidon-4-ol,
5,5-dimethyl-6-isopropyl-2-hexahydropyrimidon-4-ol, and analogous 4-butyl, 4-dodecyl, 4-cyclohexyl, 4-benzyl, 4-phenyl and 4-piperidinyl-(2) ethers.

It is preferred to use as oxidizing agents inorganic or organic peroxides such as sodium peroxide, barium peroxide, hydrogen peroxide, diacetyl peroxide, their addition compounds such as sodium peroxoborate, peroxy acids such as peroxomonosulfuric acid or peracetic acid, manganese(IV), manganese(VII) or chromium(VI) compounds such as manganese dioxide, permanganates, chromic anhydride or bichromates. The oxidizing agents may be used in the stoichiometric amounts or in excess and are preferably supplied to the reaction in up to 0.5 times excess over the stoichiometric amount.

The reaction is carried out as a rule at a temperature of from 0° to 150° C., preferably from 50° to 110° C., at atmospheric or superatmospheric pressure, continuously or batchwise. It is advantageous to use one or more organic and/or inorganic solvents which are inert under the reaction conditions, such as water; inorganic or organic acids, for example sulfuric or acetic acid; or alcohols, for example methanol or butanol.

The reaction may be carried out as follows. The oxidizing agent, with or without one or more solvents, is gradually added at the said temperature in the course of thirty minutes to two hours to the substituted 2-hexahydropyrimidone-4-ether or 2-hexahydropyrimidon-4-ol, with or without a solvent or solvent mixture, while mixing well. The reaction mixture is then allowed to react for another one to twelve hours and cooled if necessary and the end product formed is filtered off. Further amounts of end product may be recovered from the filtrate by conventional methods, for example by concentrating the solution and recrystallizing the solid formed from water or acetonitrile.

The compounds which can be prepared by the process according to this invention are valuable starting materials for the production of herbicides, bleaching agents, detergents and β-aminocarboxylic acids. Thus for example aminopivalic acid may be obtained by reaction of 5,5-dimethylhexahydropyrimidinodione-(2) with barium hydroxide followed by precipitation of the barium ions with sulfuric acid (cf. U.S. Patent Specification No. 2,514,549 as regards applications).

The invention is illustrated by the following Examples in which the parts specified are parts by weight.

EXAMPLE 1

144 parts of 5,5-dimethylhexahydropyrimidinen-2-ol-(4) is dissolved in 500 parts of hot water. 120 parts of 30% hydrogen peroxide is gradually added at 60° to 70° in the course of ninety minutes while stirring. The reaction mixture is kept for another twelve hours at 80° to 90° C. and the mixture is cooled. The 5,5-dimethylhexahydropyrimidinodione-(2,4) which has precipitated in the form of colorless crystals is filtered off and 92 parts thereof is obtained. Another 10.5 parts is obtained by concentrating the solution under subatmospheric pressure to about half its volume. This makes the total yield 102.5 parts, equivalent to 72% of the theory with reference to the starting material used. The melting point is 248° to 250° C. after recrystallization from water or acetonitrile.

Analysis.—Calculated: C, 50.69%; H, 7.09%; O, 22.51%; N, 19.71%. Found: C, 50.8%; H, 7.2%; O, 22.6%; N, 19.8%.

EXAMPLE 2

158 parts of 5,5-dimethyl-4-methoxyhexahydropyrimidinone-(2) is dissolved in 700 parts of hot water and 120 parts of 30% hydrogen peroxide is added in the course of an hour at 70° C. The reaction mixture is stirred for another twelve hours at 80° to 90° C., and the solution is then cooled. 81 parts and, on concentration, another 14.5 parts of 5,5-dimethylhexahydropyrimidinodione-(2,4) crystallize out, this being equivalent to a yield of 63% of the theory with reference to starting material used.

EXAMPLE 3

144 parts of 5,5-dimethylhexahydropyrimidinon-(2)-ol-(4) is dissolved in 700 parts of 15% sulfuric acid and at 30° to 50° C. (while cooling with ice) reacted in the course of about ninety minutes with vigorous stirring with portions of finely powdered potassium permanganate until a deep violet coloration persists. The mixture is stirred for another hour at 50° C., boiled and filtered through a hot water funnel. Upon cooling and concentrating the mixture, 98 parts of 5,5-dimethylhexahydropyrimidinodione-(2,4) crystallizes out, this amount being equivalent to 69% of the theory with reference to the starting material used.

EXAMPLE 4

186 parts of 5,5-dimethyl-6-isopropylhexahydropyrimidinon-2-ol-(4) is dissolved in 500 parts of 15% sulfuric acid and reacted in the course of two hours at 95° to 110° C. with an aqueous solution of 145 parts of potassium chromate. The whole is stirred for another two hours at 100° C. and cooled and the solution is concentrated. By filtering off the colorless crystals, 155 parts of 5,5-dimethyl-6-isopropylhexahydropyrimidinodione-(2,4) is obtained; the yield is 84% of the theory with reference to the starting material. The melting point is 235° to 237° C. after recrystallization from water or acetonitrile.

Analysis.—Calculated: C, 58.67%; H, 8.75%; O, 17.37%; N, 15.21%. Found: C, 58.5%; H, 9.0%; O, 17.5%; N, 15.0%.

EXAMPLE 5

186 parts of 5,5-dimethyl-6-isopropylhexahydropyrimidinon-2-ol-(4) is dissolved in 500 parts of hot water and reacted while stirring in the course of ninety minutes at 60° to 70° C. with 120 parts of 30% hydrogen peroxide. The mixture is kept for another twelve hours at 80° to 90° C. and cooled and the solution is concentrated. 164 parts of 5,5 - dimethyl - 6 - isopropylhexahydropyrimidinodione-(2,4) is obtained, equivalent to yield of 89% of the theory, with reference to the starting material.

The invention is hereby claimed as follows:

1. A process for the production of 2,4-hexahydropyrimidinodione having identical or different substituents in the 5- and/or 6- positions which comprises oxidizing, at a temperature in the range of 0 to 150° C., 2-hexahydropyrimidone-4-ether or 2-hexahydropyrimidone-4-ol with an oxidizing agent selected from the group consisting of sodium peroxide, barium peroxide, hydrogen peroxide, diacetyl peroxide, addition compounds thereof, peroxy acids and manganese (IV), manganese (VII), or chromium (VI) oxidizing compounds, said 2-hexahydropyrimidone-4-ether or said 2-hexahydropyrimidone-4-ol having identical or different substituents in the 5- and/or 6-position selected from the group consisting of n- or iso-alkyl having up to 12 carbon atoms, cyclohexyl, benzyl, phenyl, naphthyl, pyridyl, piperidyl, and morpholinyl, and the ether substituent of said 2-hexahydropyrimidone-4-ether being selected from the group consisting of alkyl having up to 12 carbon atoms, cyclohexyl, phenyl, benzyl and piperidinyl, by gradually adding said oxidizing agent in stoichiometric excess up to 0.5 times above the stoichiometric amount to said 2-hexahydropyrimidone-4-ether or said 2-hexahydropyrimidone-4-ol at said temperature over a period of 30 minutes to 2 hours with good mixing, and thereafter holding the resultant reaction mixture at said temperature for an additional 1 to 12 hours.

2. A process as claimed in claim 1 wherein said peroxy compound is selected from the group consisting of sodium peroxide, barium peroxide, hydrogen peroxide, diacetyl peroxide, addition compounds thereof, and peroxy acids.

3. A process as claimed in claim 1 wherein said oxidizing agent is an oxidizing compound of manganese (IV), manganese (VII) or chromium (VI).

4. A process as claimed in claim 1 wherein the compound which is oxidized is a 2-hexahydropyrimidone-4-ether having an alkyl ether group in the 4-position.

5. A process as claimed in claim 4 wherein said substituents in the 5- and/or 6-positions constitute n- or iso-alkyl groups having 1 to 12 carbon atoms.

6. A process as claimed in claim 1 wherein the compound which is oxidized is a 2-hexahydropyrimidone-4-ol.

7. A process as claimed in claim 6 wherein said substituents in the 5- and/or 6-positions constitute n- or iso-alkyl groups having 1 to 12 carbon atoms.

8. A process as claimed in claim 1 wherein said temperature is in the range of 50 to 110° C.

9. A process as claimed in claim 1 wherein the oxidizing reaction is carried out in an inert solvent selected from the group consisting of water, and inorganic acid, an organic acid, in alcohol and mixtures thereof.

References Cited

Noller. *Chemistry of Organic Compounds*, Saunders Company, Philadelphia, 1965 (pp. 150–152 relied on).

NICHOLAS S. RIZZO, Primary Examiner

A. M. TIGHE, Assistant Examiner

U.S. Cl. X.R.

260—251 R, 534 R